(12) United States Patent
Karbakhsh

(10) Patent No.: US 10,065,207 B1
(45) Date of Patent: Sep. 4, 2018

(54) EXPANDABLE CAULKING GUN WITH DISPLAY SYSTEM

(71) Applicant: Hossein Karbakhsh, Vaughan (CA)

(72) Inventor: Hossein Karbakhsh, Vaughan (CA)

( * ) Notice: Subject to any disclaimer, the term of this patent is extended or adjusted under 35 U.S.C. 154(b) by 0 days.

(21) Appl. No.: 15/493,227

(22) Filed: Apr. 21, 2017

(51) Int. Cl.
| | |
|---|---|
| B05C 17/00 | (2006.01) |
| B05C 17/01 | (2006.01) |
| B05C 17/005 | (2006.01) |
| H04N 5/232 | (2006.01) |
| H04N 5/225 | (2006.01) |

(52) U.S. Cl.
CPC ...... *B05C 17/0103* (2013.01); *B05C 17/0052* (2013.01); *H04N 5/2253* (2013.01); *H04N 5/23293* (2013.01)

(58) Field of Classification Search
CPC ............ B05C 17/0052; B05C 17/0103; B05C 17/005; B05C 17/00596; B05C 17/01; H04N 5/2253; H04N 5/23293
USPC .......................... 222/192, 386, 389, 390, 391
See application file for complete search history.

(56) References Cited

U.S. PATENT DOCUMENTS

| | | | | |
|---|---|---|---|---|
| 6,030,402 | A * | 2/2000 | Thompson | A61B 17/3494 606/105 |
| 2003/0232152 | A1* | 12/2003 | Allam | C03C 17/001 427/595 |
| 2004/0006347 | A1* | 1/2004 | Sproul | A61B 8/12 606/92 |
| 2009/0069846 | A1* | 3/2009 | Bull | A61B 17/0469 606/228 |
| 2011/0184520 | A1* | 7/2011 | Trieu | A61B 17/562 623/17.11 |
| 2011/0238187 | A1* | 9/2011 | Evans | A45B 9/00 623/27 |
| 2012/0136442 | A1* | 5/2012 | Kleiner | A61F 2/4455 623/17.11 |
| 2012/0191191 | A1* | 7/2012 | Trieu | A61B 17/683 623/17.11 |
| 2012/0267394 | A1* | 10/2012 | Pierson | A61C 9/0026 222/94 |
| 2013/0131683 | A1* | 5/2013 | Shah | A61B 17/8802 606/93 |
| 2016/0022972 | A1* | 1/2016 | Rabe | A45D 34/00 401/195 |
| 2016/0047400 | A1* | 2/2016 | Tanner | F16L 55/18 60/484 |
| 2017/0367846 | A1* | 12/2017 | Greenhalgh | A61B 90/57 |

* cited by examiner

*Primary Examiner* — Patrick M Buechner
(74) *Attorney, Agent, or Firm* — Nasser Ashgriz; UIPatent Inc.

(57) ABSTRACT

The present invention is an expandable caulking gun having a distal end and a proximal end which receive a caulking cartridge with a caulking material comprises of a cartridge-holder extended from the distal end to the proximal end to receive said caulking cartridge; a trigger mechanism at the distal end to push a push-rod; a display holder adjustably attached to a top portion of said trigger mechanism; a camera adjustably attached to said proximal end and having a communication means to connect to a handheld device; whereby a user places said handheld device on said display holder and connects said camera to said handheld device to observe a surface or grooves located a distance from said user while applying said caulking material.

9 Claims, 4 Drawing Sheets

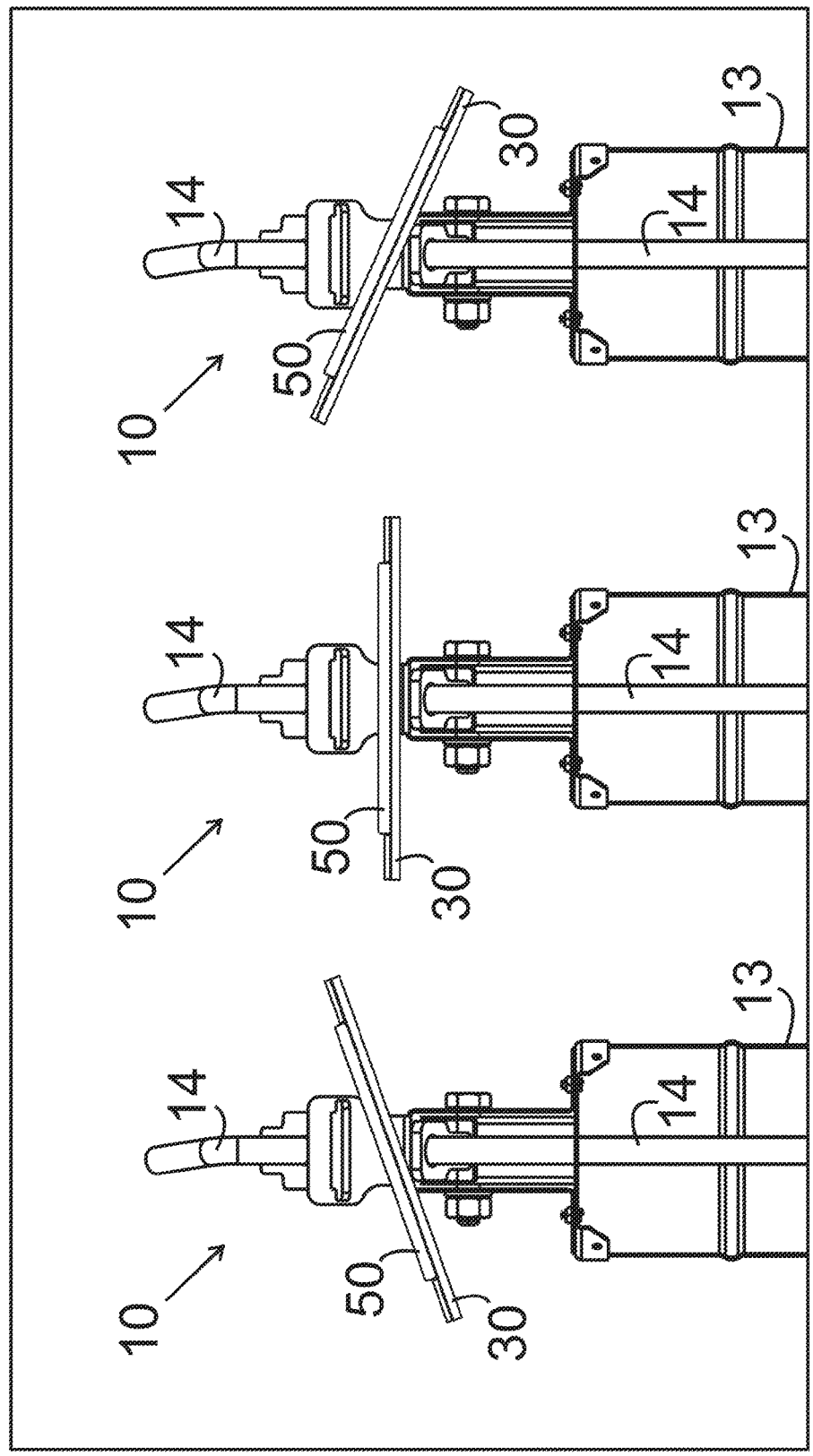

EXPANDABLE CAULKING GUN WITH DISPLAY SYSTEM

FIELD OF THE INVENTION

The present invention relates in general to a dispensing device and in particular, to a caulking gun having a display system.

BACKGROUND OF THE INVENTION

A user should use a ladder to reach hard to reach surfaces or bend to apply caulking material. By the time, the user may suffer joint pain when regularly use the caulking gun. Applying caulking by a caulking gun to achieve a smooth surface when using a ladder is cumbersome. The user should periodically change the location of the ladder to apply the caulking. The smooth surface cannot be achieved by the prior arts. The user applying the caulking with the expandable gun has no good access to the surface and grooves.

Accordingly, it is a need for an improvement in existing caulking guns which will overcome the problems that the present invention is directed.

SUMMARY OF THE INVENTION

The present invention is an expandable caulking gun with a display system capable of applying caulking material to a surface or grooves. The expandable caulking gun has a distal end and a proximal end which receive a caulking cartridge with a caulking material. The expandable caulking gun comprises of a cartridge-holder extended from the distal end to the proximal end to receive the caulking cartridge; a trigger mechanism at the distal end to push a push-rod; a display holder adjustably attached to a top portion of the trigger mechanism; a camera adjustably attached to the proximal end and having a connection means to connect to a handheld device.

A user for using the expandable caulking gun of the present invention places the handheld device such as mobile phone on the display holder and connects the camera to the handheld device to observe a surface or grooves located a distance from the user while applying the caulking material.

The first object of the present invention is an expandable caulking gun which provides better access to hard reach surfaces.

The second object of the present invention is an expandable caulking gun which provides better observation during the caulking applying.

Another object of the present invention is to provide a removable camera or the display system from the expandable caulking gun.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 3A shows a top view of an expandable caulking gun of the present invention showing the display holder with a mobile device;

FIG. 3B shows a top view of an expandable caulking gun of the present invention showing the display holder with a mobile device;

FIG. 3C shows a top view of an expandable caulking gun of the present invention showing the display holder with a mobile device;

The figures are not intended to be exhaustive or to limit the present invention to the precise form disclosed. It should be understood that the invention can be practiced with modification and alteration, and that the disclosed technology be limited only by the claims and equivalents thereof.

DETAILED DESCRIPTION OF PREFERRED EMBODIMENTS

The invention disclosed herein, in accordance with one or more various embodiments, is described in detail with reference to the following figures. The drawings are provided for purposes of illustration only and merely depict typical or example embodiments of the disclosed invention. These drawings are provided to facilitate the reader's understanding of the disclosed invention and shall not be considered limiting of the breadth, scope, or applicability thereof. It should be noted that for clarity and ease of illustration these drawings are not necessarily made to scale.

Figure 1:
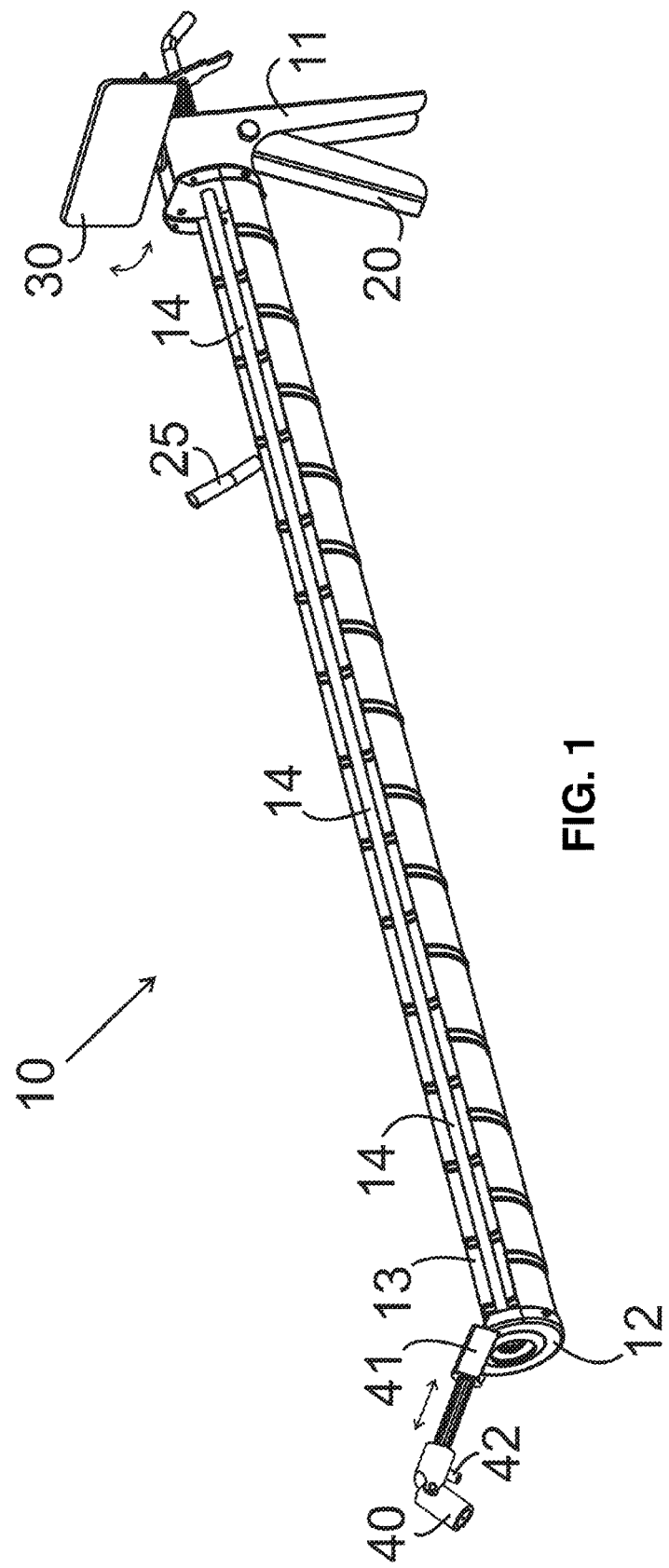
FIG. 1 shows a perspective view of an expandable caulking gun of the present invention.

As shown in FIG. 1, an expandable caulking gun 10 of the present invention has a distal end 11 and a proximal end 12 which receive a caulking cartridge (not shown) with a caulking material. The expandable caulking gun 10 comprises of a cartridge-holder 13 extended from the distal end 11 to the proximal end 12 to receive the caulking cartridge; a trigger mechanism 20 at the distal end 11 to push a push-rod 14; a display holder 30 adjustably attached to a top portion 21 of the trigger mechanism 20.

Again as shown in FIG. 1, a camera 40 adjustably attached to the proximal end 12 and has a connection means 41 to connect to the proximal end 12 of the expandable caulking gun 10. When a user places a handheld device such as a mobile device on the display holder 30; he/she can connects the camera 40 to the handheld device by a Bluetooth connection to observe a surface or grooves located a distance from the user while applying the caulking material.

The camera 40 can pair to the handheld device and shows the surface or grooves located a distance from the user on to the display screen of the handheld device.

Again as shown in FIG. 1, the expandable caulking gun 10 of the present invention further has a flash light 42 which is designed in approximate distance to the camera 40. The user can adjust the orientation and angle of the flash light 42 based on the camera 40.

Again as shown in FIG. 1, the expandable caulking gun 10 of the present invention further has a handle 25 which is designed in a middle of the cartridge-holder 13. The handle 25 can be placed in the right side or the left side of the cartridge-holder 13 based on the user preferences to hold the expandable caulking gun 10. The location of the handle 25 can be changed by a right-handed user or a left-handed user.

In one embodiment of the present invention, the expandable caulking gun 10 further has a shoulder strap to support the weight of the expandable caulking gun 10 for the user. The location for the attachment of the shoulder strap to the expandable caulking gun 10 can be variable based on user's preferences.

In another embodiment of the present invention, the expandable caulking gun 10 of the present invention further has an electric trigger. The electric trigger can electrically push the push-rod 14 forward and backward to apply caulking material from the caulking cartridge.

Figure 2:
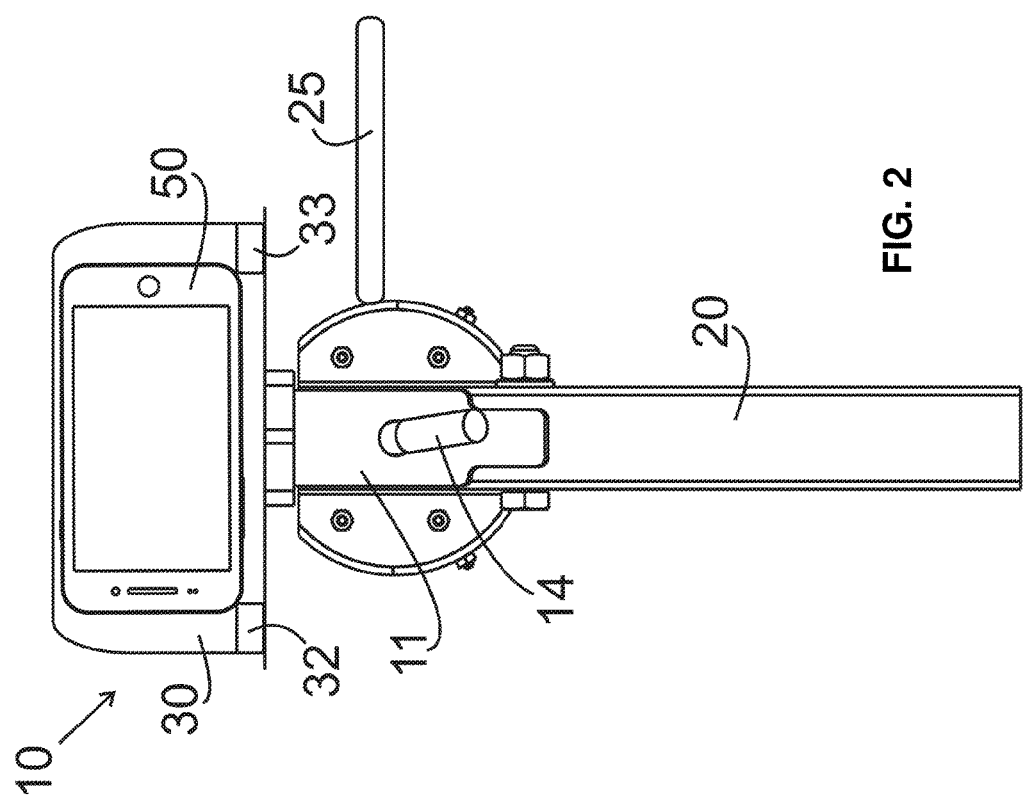
FIG. 2 shows a lateral view of an expandable caulking gun of the present invention showing the display holder with a mobile device.

As shown in FIG. 2, the display holder 30 of the present invention has a rotatable base 31. The rotatable base 31 attaches to the top portion 21 of the trigger mechanism 20. The user can change the angle of the display holder 30 to have better vision while applying a caulking material.

Again as shown in FIG. 2, the display holder 30 of the present invention has a connection means 32, 33 to hold a mobile device 50 or a handheld device with different sizes. The connection means 32, 33 can grab a distal end and a proximal end of the mobile device 50 or the handheld device and secure it in the display holder while the user moves the expandable caulking gun.

The rotatable base 31 can rotate and tilt the display holder 30 in different angles based on the user preferences. The screen of the mobile device 50 can be in an angle which the user can easily trace the applying material.

FIGS. 3A, 3B and 3C show the display holder 30 of the present invention in different angles. The display holder 30 can rotate to right and left or tilt up and down to provide a better access for the user.

Figures 4A, 4B:
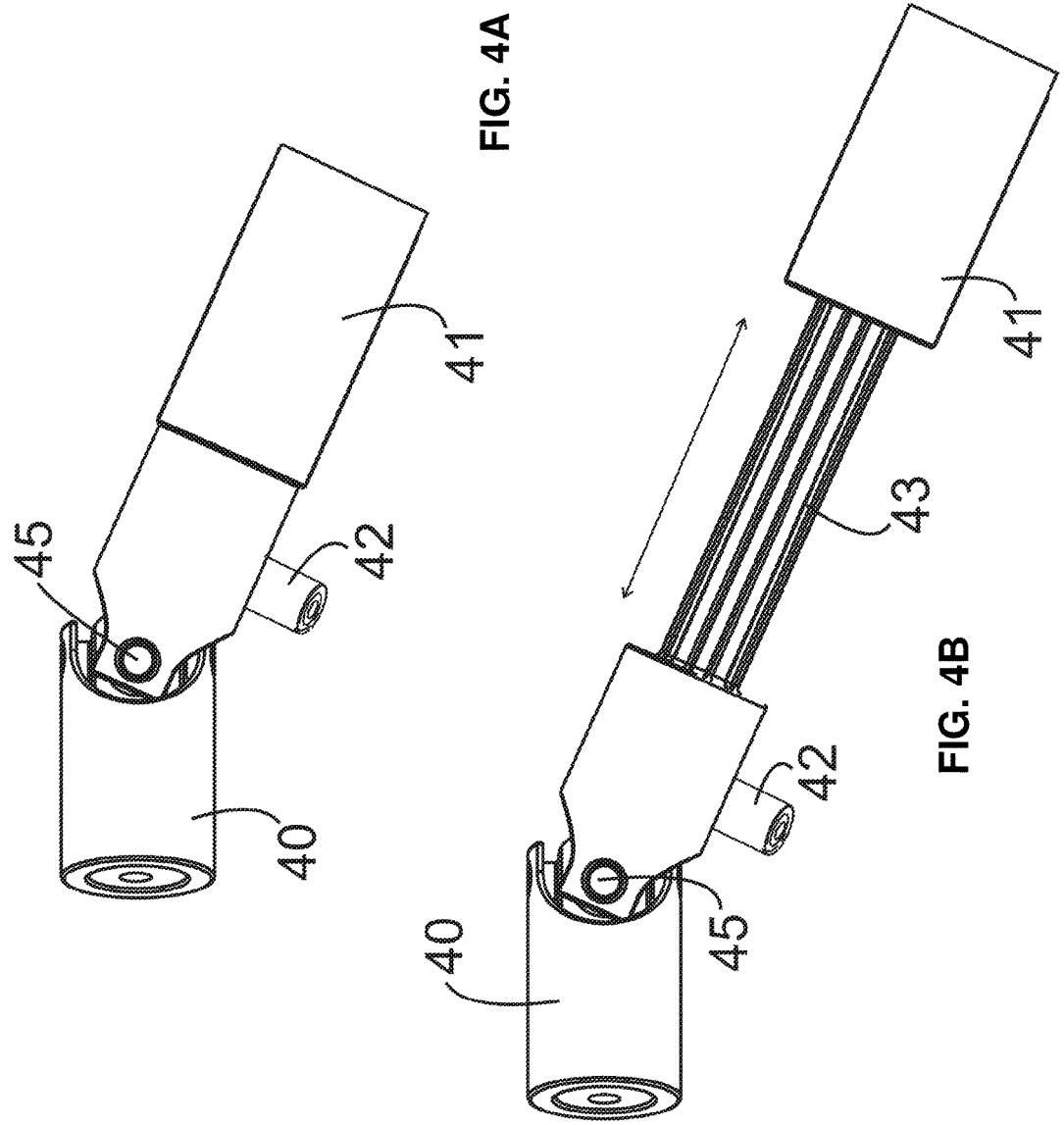
FIG. 4A shows a perspective view of an expandable camera of the present invention.
FIG. 4B shows a perspective view of an expandable camera of the present invention.

FIGS. 4A and 4B show an expandable camera 40 of the present invention. The expandable camera 40 has a telescopic leg 43 which can change the length of the camera 40. The camera 40 can rotate over a rotate point 45 to adjust the orientation of the camera 40 over the working piece. The flash light also can rotate over a rotate point to light the working piece at the same angle with the camera. The user can change the length and the angle of the camera 40 and adjust the flash light 42 to have a better vision over the working piece.

Again, as shown in FIGS. 4A and 4B, the camera 40 has a connection means 41 which connect the camera 40 to the proximal end of the expandable caulking gun 10 of the present invention. The connection means can be selected from the groups consisting of a mechanical connection or a magnetic connection. The magnetic connection can attach the camera 40 to the proximal end of the expandable caulking gun of the present invention.

The expandable camera and the display holder of the present invention are detachable to the expandable caulking gun of the present invention. The user can detach them from the caulking gun for the storage purposes.

The camera and the flash light in the present invention are operated by at least a battery. The battery is placed in the housing of the camera holder.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An expandable caulking gun having a distal end and a proximal end which receive a caulking cartridge with a caulking material comprises of:
    a) a cartridge-holder extended from said distal end to said proximal end to receive said caulking cartridge;
    b) a trigger mechanism at said distal end to push a push-rod;
    c) a display holder adjustably attached to a top portion of said trigger mechanism;
    d) a camera adjustably attached to said proximal end and having a communication means to connect to a handheld device;
        whereby a user places said handheld device on said display holder and connects said camera to said handheld device to observe a surface or grooves located a distance from said user while applying said caulking material.

2. The expandable caulking gun of claim 1, wherein said trigger mechanism is selected from the groups consisting of a manual trigger and an electric trigger.

3. The expandable caulking gun of claim 1, wherein said communication means is a Blue-tooth connection between said camera and said handheld device.

4. The expandable caulking gun of claim 1, wherein said expandable caulking gun further having a handle to be adjusted near said distal end for a right-handed user or a left-handed user.

5. The expandable caulking gun of claim 1, wherein said expandable caulking gun further having an adjustable light connected to said proximal end to lighten said surface and grooves.

6. The expandable caulking gun of claim 1, wherein said camera further has a telescopic leg which is adjusted to said surface or grooves.

7. The expandable caulking gun of claim 1, wherein said camera is extendable.

8. The expandable caulking gun of claim 1, wherein said camera further has a connection means to connect to said proximal end of the expandable caulking gun.

9. The expandable caulking gun of claim 8, wherein said connection means is selected from the group consisting of a mechanical connection or a magnetic connection.

* * * * *